US007716075B1

(12) United States Patent
Payne

(10) Patent No.: US 7,716,075 B1
(45) Date of Patent: May 11, 2010

(54) COMPUTER BASED SYSTEM FOR PRICING TAX FLOW-THROUGH ANNUITY PRODUCT

(75) Inventor: Richard C. Payne, Mississauga (CA)

(73) Assignee: Genesis Financial Products, Inc., Mississauga, ON (CA)

( * ) Notice: Subject to any disclaimer, the term of this patent is extended or adjusted under 35 U.S.C. 154(b) by 1628 days.

(21) Appl. No.: 10/888,246

(22) Filed: Jul. 9, 2004

Related U.S. Application Data

(60) Provisional application No. 60/485,805, filed on Jul. 9, 2003, provisional application No. 60/478,782, filed on Jun. 16, 2003.

(51) Int. Cl.
G06Q 40/00 (2006.01)
(52) U.S. Cl. .................................... 705/4; 705/35
(58) Field of Classification Search ............... 705/35, 705/36, 4
See application file for complete search history.

(56) References Cited

U.S. PATENT DOCUMENTS 6,064,986 A * 5/2000 Edelman .............. 705/36 R

| 6,950,805 | B2 * | 9/2005 | Kavanaugh | 705/35 |
| 2002/0007329 | A1 * | 1/2002 | Alcaly et al. | 705/35 |
| 2003/0105652 | A1 * | 6/2003 | Arena et al. | 705/4 |
| 2004/0039675 | A1 * | 2/2004 | Wallman | 705/36 |
| 2004/0078244 | A1 * | 4/2004 | Katcher | 705/4 |
| 2004/0181436 | A1 * | 9/2004 | Lange | 705/4 |
| 2006/0212380 | A1 * | 9/2006 | Williams et al. | 705/35 |
| 2007/0027787 | A1 * | 2/2007 | Tripp | 705/36 |

* cited by examiner

*Primary Examiner*—James P Trammell
*Assistant Examiner*—John A Anderson
(74) *Attorney, Agent, or Firm*—Simpson & Simpson, PLLC

(57) ABSTRACT

A computer-based method, system and apparatus for pricing a tax flow-through annuity product. The resulting product is superior to traditional VA's, offering: lifetime income guarantees; capital gains tax treatment on annuity withdrawals; stock dividends taxed as dividends, not ordinary income; ETF-like tax efficiency by minimizing capital gains distributions, even on actively-managed funds; and wealth transfer efficiency through step-up in basis on death. The product benefits life insurance carriers and distributors. Investor benefits include: the ability to realize the full benefit of recent tax reform; the potential for better tax treatment than existing mutual funds; a guarantee of lifetime income; and the ability to pass assets on to heirs efficiently.

17 Claims, 4 Drawing Sheets

|     | dji      | aa       | ge       | jnj      | msft     | axp      | gm       | jpm      |
|-----|----------|----------|----------|----------|----------|----------|----------|----------|
| dji | 1        |          |          |          |          |          |          |          |
| aa  | 0.090056 | 1        |          |          |          |          |          |          |
| ge  | 0.747363 | 0.038625 | 1        |          |          |          |          |          |
| jnj | 0.432504 | 0.035813 | 0.31413  | 1        |          |          |          |          |
| msft| 0.563007 | 0.048682 | 0.438821 | 0.1671   | 1        |          |          |          |
| axp | 0.728789 | 0.050997 | 0.622514 | 0.294583 | 0.3664   | 1        |          |          |
| gm  | 0.626091 | 0.100376 | 0.443063 | 0.208225 | 0.343287 | 0.422034 | 1        |          |
| jpm | 0.147481 | 0.26892  | 0.111562 | 0.051046 | 0.104432 | 0.133587 | 0.149843 | 1        |
| pg  | 0.344134 | -0.00975 | 0.229974 | 0.308177 | 0.044965 | 0.1863   | 0.145785 | -0.07275 |
| ba  | 0.132106 | 0.321396 | 0.087318 | 0.012281 | 0.026506 | 0.082565 | 0.093051 | 0.211504 |
| hd  | 0.120393 | 0.166834 | 0.079303 | 0.015343 | 0.091338 | 0.070657 | 0.097606 | 0.424698 |
| ko  | 0.370498 | 0.019309 | 0.246864 | 0.301215 | 0.132684 | 0.268372 | 0.170113 | 0.0193   |
| sbc | 0.451338 | 0.048168 | 0.309896 | 0.231842 | 0.228226 | 0.346903 | 0.234145 | 0.088521 |
| c   | 0.746429 | 0.042891 | 0.622694 | 0.272782 | 0.428936 | 0.716737 | 0.438237 | 0.133904 |
| hon | 0.130526 | 0.40048  | 0.099784 | 0.081596 | 0.034626 | 0.074529 | 0.09709  | 0.23305  |
| mcd | 0.071376 | 0.235733 | 0.077011 | -0.03282 | 0.025776 | 0.062964 | 0.083679 | 0.092324 |
| t   | 0.292783 | 0.009613 | 0.199231 | 0.070695 | 0.217235 | 0.195337 | 0.212716 | 0.07088  |
| cat | 0.612893 | 0.061974 | 0.435657 | 0.212813 | 0.262482 | 0.391613 | 0.412274 | 0.138584 |
| hpq | 0.513232 | 0.059319 | 0.372094 | 0.060713 | 0.423841 | 0.339003 | 0.307621 | 0.100848 |
| mmm | 0.090066 | 0.407581 | 0.061196 | 0.049355 | 0.00383  | 0.066101 | 0.081639 | 0.190081 |
| utx | 0.574281 | 0.088398 | 0.455381 | 0.19895  | 0.279183 | 0.369502 | 0.383771 | -8E-05   |
| dd  | 0.09169  | 0.53251  | 0.085421 | 0.041916 | 0.054817 | 0.056    | 0.094221 | 0.248466 |
| ibm | 0.575575 | 0.048861 | 0.419262 | 0.139153 | 0.429123 | 0.373398 | 0.322959 | 0.143398 |
| mo  | 0.257983 | 0.072021 | 0.126653 | 0.135246 | 0.028155 | 0.125319 | 0.139655 | 0.089156 |
| wmt | 0.571843 | -0.0172  | 0.458893 | 0.259254 | 0.307185 | 0.429277 | 0.295904 | 0.027213 |
| dis | 0.526249 | 0.133887 | 0.446191 | 0.184459 | 0.324619 | 0.424493 | 0.353982 | 0.123806 |
| intc| 0.560575 | 0.040742 | 0.398031 | 0.115612 | 0.592499 | 0.369554 | 0.372369 | 0.104028 |
| mrk | 0.107402 | 0.184068 | 0.099768 | -0.00963 | 0.056136 | 0.129771 | 0.088972 | 0.187058 |
| xom | 0.194407 | 0.109183 | 0.135018 | 0.103514 | 0.054548 | 0.130883 | 0.148224 | 0.015806 |
| ek  | 0.482885 | 0.0864   | 0.334158 | 0.171381 | 0.235854 | 0.306041 | 0.296588 | 0.111961 |
| ip  | 0.058781 | 0.525127 | 0.022856 | 0.011945 | 0.00474  | 0.031245 | 0.024075 | 0.212528 |
| vols| 0.212075 | 0.439172 | 0.37186  | 0.290402 | 0.448337 | 0.42337  | 0.393152 | 0.462704 |

FIGURE 1A

| pg | ba | hd | ko | sbc | c | hon | mcd | t |
|---|---|---|---|---|---|---|---|---|
| 1 | | | | | | | | |
| 0.03146 | 1 | | | | | | | |
| -0.00282 | 0.14771 | 1 | | | | | | |
| 0.327057 | 0.093337 | 0.036827 | 1 | | | | | |
| 0.187862 | 0.091522 | 0.021007 | 0.214369 | 1 | | | | |
| 0.178427 | 0.083865 | 0.063275 | 0.230827 | 0.34033 | 1 | | | |
| 0.090443 | 0.399407 | 0.137156 | 0.036961 | 0.103244 | 0.087133 | 1 | | |
| -0.05119 | 0.186424 | 0.116977 | 0.035644 | 0.040928 | 0.042701 | 0.15725 | 1 | |
| 0.022685 | 0.008288 | 0.120415 | 0.037114 | 0.225553 | 0.239557 | 0.007637 | 0.004999 | 1 |
| 0.185362 | 0.101144 | 0.103436 | 0.202636 | 0.203254 | 0.442029 | 0.07849 | 0.022219 | 0.113873 |
| 0.025331 | 0.042244 | 0.133941 | 0.081518 | 0.181911 | 0.355757 | 0.038745 | 0.042312 | 0.195844 |
| -0.01609 | 0.356215 | 0.094345 | 0.065072 | 0.094091 | 0.063861 | 0.421511 | 0.177504 | 0.011042 |
| 0.200346 | 0.142927 | 0.02654 | 0.151193 | 0.155715 | 0.382001 | 0.097573 | 0.062454 | 0.098812 |
| -0.05915 | 0.342417 | 0.139935 | 0.047997 | 0.063161 | 0.075807 | 0.419844 | 0.235349 | -0.00566 |
| 0.052368 | 0.061827 | 0.16346 | 0.089291 | 0.251206 | 0.420949 | 0.094988 | 0.062851 | 0.206873 |
| 0.15861 | 0.054295 | -0.00597 | 0.169534 | 0.174531 | 0.120772 | 0.071091 | 0.037916 | 0.060475 |
| 0.2573 | 0.064322 | 0.027197 | 0.258708 | 0.268389 | 0.429894 | 0.025406 | 0.002069 | 0.149233 |
| 0.05973 | 0.073529 | 0.078806 | 0.13853 | 0.227158 | 0.393929 | 0.11366 | 0.094111 | 0.189956 |
| 0.082825 | 0.038421 | 0.052516 | 0.089546 | 0.20249 | 0.424694 | 0.080792 | 0.058521 | 0.221638 |
| 0.012887 | 0.221186 | 0.100145 | 0.034272 | 0.085268 | 0.085776 | 0.230564 | 0.240401 | 0.024497 |
| 0.081048 | 0.131365 | 0.062267 | 0.115074 | 0.104308 | 0.182919 | 0.079351 | 0.072769 | 0.0403 |
| 0.143489 | 0.106175 | 0.057137 | 0.142424 | 0.195301 | 0.357503 | 0.071646 | 0.038602 | 0.142118 |
| -0.0186 | 0.266343 | 0.12952 | 0.035856 | 0.042467 | 0.017884 | 0.389549 | 0.179163 | -0.01116 |
| 0.344232 | 0.395063 | 0.472046 | 0.31831 | 0.400778 | 0.404071 | 0.480193 | 0.338209 | 0.660323 |

FIGURE 1B

| cat | hpq | mmm | utx | dd | ibm | mo | wmt | dis |
|---|---|---|---|---|---|---|---|---|
| 1 | | | | | | | | |
| 0.2459 | 1 | | | | | | | |
| 0.025948 | 0.0795 | 1 | | | | | | |
| 0.369482 | 0.303461 | 0.08301 | 1 | | | | | |
| 0.010204 | 0.060612 | 0.535694 | 0.114167 | 1 | | | | |
| 0.277255 | 0.458152 | 0.066447 | 0.246057 | 0.060826 | 1 | | | |
| 0.164451 | 0.058566 | 0.065674 | 0.077833 | 0.028224 | 0.104159 | 1 | | |
| 0.317365 | 0.220979 | -0.00341 | 0.267035 | -0.01182 | 0.254032 | 0.111083 | 1 | |
| 0.274618 | 0.328567 | 0.087694 | 0.356872 | 0.117893 | 0.321567 | 0.106217 | 0.272687 | 1 |
| 0.244331 | 0.49097 | 0.061123 | 0.27092 | 0.033827 | 0.476001 | 0.05571 | 0.261519 | 0.321996 |
| 0.010553 | 0.093277 | 0.253764 | 0.088384 | 0.23493 | 0.077633 | 0.063307 | 0.031737 | 0.124097 |
| 0.155416 | 0.084173 | 0.103629 | 0.188548 | 0.174056 | 0.094833 | 0.031545 | 0.073434 | 0.108813 |
| 0.382101 | 0.248823 | 0.064568 | 0.324572 | 0.082838 | 0.249529 | 0.126001 | 0.221972 | 0.280628 |
| 0.088531 | 0.044504 | 0.48409 | 0.094014 | 0.547496 | 0.01428 | 0.029488 | -0.01385 | 0.110082 |
| | | | | | | | | |
| 0.384564 | 0.564361 | 0.297679 | 0.39401 | 0.356178 | 0.415217 | 0.406704 | 0.384932 | 0.43679 |

FIGURE 1C

| intc | mrk | xom | ek | ip | vols |
|---|---|---|---|---|---|
| | | | | | 0.212075 |
| | | | | | 0.439172 |
| | | | | | 0.37186 |
| | | | | | 0.290402 |
| | | | | | 0.448337 |
| | | | | | 0.42337 |
| | | | | | 0.393152 |
| | | | | | 0.462704 |
| | | | | | 0.344232 |
| | | | | | 0.395063 |
| | | | | | 0.472046 |
| | | | | | 0.31831 |
| | | | | | 0.400778 |
| | | | | | 0.404071 |
| | | | | | 0.480193 |
| | | | | | 0.338209 |
| | | | | | 0.660323 |
| | | | | | 0.384564 |
| | | | | | 0.564361 |
| | | | | | 0.297679 |
| | | | | | 0.39401 |
| | | | | | 0.356178 |
| | | | | | 0.415217 |
| | | | | | 0.406704 |
| | | | | | 0.384932 |
| | | | | | 0.43679 |
| 1 | | | | | 0.600588 |
| 0.071356 | 1 | | | | 0.328289 |
| 0.0712 | 0.069321 | 1 | | | 0.282462 |
| 0.271188 | 0.083275 | 0.118547 | 1 | | 0.376358 |
| 0.004786 | 0.180145 | 0.106385 | 0.091241 | 1 | 0.39085 |
| 0.600588 | 0.328289 | 0.282462 | 0.376358 | 0.39085 | |

FIGURE 1D

COMPUTER BASED SYSTEM FOR PRICING TAX FLOW-THROUGH ANNUITY PRODUCT

CROSS-REFERENCE TO RELATED APPLICATIONS

This application claims the benefit under 35 U.S.C. §119(e) of U.S. Provisional Application No. 60/485,805 filed Jul. 9, 2003 which claimed the benefit under 35 U.S.C. §119(e) of U.S. Provisional Application No. 60/478,782 filed on Jun. 16, 2003 and under 35 U.S.C. §119(a) of U.S. patent application Ser. No. 10/463,180 filed on Jun. 16, 2003.

REFERENCE TO COMPUTER PROGRAM LISTING APPENDIX

This patent application incorporates herein by reference the computer program contained in the attached files, named GSW1.IJS, LMM1.cfg, LMM1.dof, LMM1.DPR, svd2.cfg, svd2.dof, svd2.dpr, tma1v.txt, and TMA1V.w3. The present application includes a computer program listing appendix on compact disc. Two duplicate compact discs are provided herewith. Each compact disc contains an ASCII text file of the computer program listing as follows:

| Name | Size (KB) | Modified |
| --- | --- | --- |
| GSW1.IJS | 13 | Feb. 9, 2001 |
| LMM1.cfg | 1 | Jun. 6, 2003 |
| LMM1.dof | 2 | Jun. 6, 2003 |
| LMM1.DPR | 29 | Jun. 6, 2003 |
| svd2.cfg | 1 | Jun. 4, 2003 |
| svd2.dof | 1 | Jun. 4, 2003 |
| svd2.dpr | 6 | Jun. 4, 2003 |
| tma1v.txt | 230 | Jul. 9, 2003 |
| TMA1V.w3 | 403 | Jul. 9, 2003 |

The computer program listing appendix is hereby expressly incorporated by reference in the present application.

FIELD OF THE INVENTION

The present invention relates generally to financial products, more specifically to computer-based systems for pricing financial products, and, even more particularly, to a computer-based system for pricing a tax flow-through annuity product.

BACKGROUND OF THE INVENTION

Variable annuities (VA's) are contracts, resembling mutual funds, offered by insurance companies. Investors purchase these contracts to save for retirement. According to NAVA, the National Association for Variable Annuities, Americans have approximately $800 billion currently invested in variable annuities.

Investors obtain many valuable benefits through the use of these products, such as:

The ability to invest in a large number (as many as sixty in some cases) of equity and fixed-income choices within one contract;

A guaranteed death benefit payable by the insurance company, typically at least equal to the amount invested, regardless of the performance of the investment choices made within the contract;

Immediate annuity purchase rates guaranteed for the life of the contract, and

The ability to receive income for life, regardless of how long the annuitant may live, by applying funds to an immediate annuity (known as "annuitizing").

An important criterion for the success of any investment strategy is its after-tax return. There are two main categories of tax treatment for variable annuities. VA's may be categorized as either "non-qualified" (in which case they are used to supplement tax-qualified retirement savings plans such as pension plans, IRA's, and 401(k) plans) or qualified (in which case the contract is actually a component of a qualified plan such as a 401(k) plan).

Non-qualified variable annuities are tax-deferred, so long as the requirements imposed by the Internal Revenue Code are satisfied. Key among these are diversification requirements on insurer separate account assets, and that investment companies (mutual funds) made available through a VA cannot also be available to the general public, i.e. they must be insurance-only mutual funds.

If these requirements are satisfied, then investment income inside a variable annuity contract, whether arising from interest, dividends, or gains on the sale of securities, is not currently taxable to the owner of the contract until it is withdrawn or paid out as a death benefit. Tax-deferral is a mixed blessing, however, because taxes are merely deferred, not forgiven, and the (eventual) tax treatment of annuity withdrawals and death benefits is unfavorable compared with that of direct equity holdings. Amounts withdrawn from an annuity have been taxed first as income, then as return of basis, since the early 1980's. Additionally, income resulting from annuity withdrawals or death benefits is always classified as ordinary income: it loses any characterization that it would have had as capital gains or dividend income if the income had been received directly.

On the other hand, failure of a VA to meet the requirements of the Internal Revenue Code leads to a worst-of-all-possible-worlds result: Regulation 1.817-5(a) provides that the product will lose its tax deferral, but that dividends and capital gains will still be taxed as ordinary income.

The disadvantages of this ordinary income treatment, relative to directly holding equities in a brokerage account, have been exacerbated by recent tax reform. H.R. 2, The Jobs and Growth Tax Relief Reconciliation Act of 2003, which became law on May 28th 2003, reduced the top marginal income tax rate on ordinary income to 35%, while reducing the top rate on dividends and long-term capital gains to 15%. This makes long-term buy-and-hold equity investments inside a VA relatively less attractive than they were previously. However, short-term trading strategies and market-timing strategies are still attractive inside a VA, since they would tend to generate short-term gains taxable at a higher rate. As a result, these strategies continue to benefit from the tax deferral offered by a VA.

A key decision for investors is, therefore, the appropriate allocation of their retirement funds to:

a) tax-deferred investments (such as VA's), versus b) currently-taxable investments seeking to generate dividend income and long-term capital gains (such as stocks and mutual funds), to minimize total income tax payable over some planning period.

Additionally, passing on assets to heirs in a tax-efficient manner is often an important planning objective for investors. Stocks and mutual fund shares held directly by the investor receive a "step-up in basis" at the investor's death, so that only gains occurring thereafter will be taxable to the heirs when the equity is eventually sold. In contrast, equities held within a variable annuity do not receive a step-up in basis—any gain over the amount invested is taxed as ordinary income.

Because the guarantees offered by variable annuities are generally not available to the funds allocated to currently-taxable investments, investors trying to minimize income taxes may be compromising their death benefits or retirement income benefits. Complicating the issue further, many actively-managed mutual funds trade very frequently with the objective of maximizing pre-tax, rather than after-tax, returns, so that currently-taxable investments may not even achieve the sought-after long-term capital gains treatment.

Life insurance carriers issuing traditional variable annuities also face a number of difficulties, including the following problems:

Declining equity markets have hurt VA sales;

Declining equity markets have also led to lower fee income, making it hard for carriers to recoup the acquisition costs of the business in force;

Many guaranteed options (such as the Guaranteed Minimum Income Benefit (GMIB), and the Guaranteed Minimum Death Benefit (GMDB)) that life insurance companies sold during the equity market run-up of the late 1990's were underpriced, and in many cases insufficient reserves were set up for these benefits. Losses on this business have harmed the bottom lines of a number of carriers; and As regulators have become aware of these problems they have made multiple revisions to reserve and capital requirements for VA carriers, with the continuing uncertainty in this area making it difficult to develop new products or forecast financial results for existing ones. In addition to these existing problems, recently-enacted H.R. 2 makes tax-deferred products relatively less attractive, with some insurance industry analysts projecting a resulting 20% drop in annuity sales.

Life insurance distributors also face a number of problems, including the following:

Low sales resulting from weak equity performance; Carriers are retrenching on VA benefits, i.e. raising prices on previously-underpriced benefits;

There has been little product innovation recently, leaving distributors with little or no "sizzle" to sell; and It will likely become harder to sell the ordinary income treatment of annuity withdrawals when investments held directly are taxed more favorably.

Accordingly, there is a long-felt need for a variable annuity product that complements existing VA products, by permitting the investor to achieve dividend and long-term capital gains tax treatment on their retirement funds, without giving up the other benefits and guarantees of a variable annuity. There is correspondingly a long-felt need for a computer-based system to be used to price such a variable annuity product.

SUMMARY OF THE INVENTION

The present invention broadly comprises a computer-based method for pricing a tax flow-through annuity product, offered to a policyholder by a life insurance company, having a plurality of underlying investments and investment managers, comprising: generation of a set of yield curve scenarios consistent with valuation parameters; generation of a financial market scenario for each of said yield curve scenarios, comprising said yield curve scenario and an equity market scenario consistent with said yield curve scenario and said valuation parameters; determination of a terminal account value and set of pre-tax cashflows for each of said financial market scenarios, incorporating policyholder, investment manager, and insurance company behavioral assumptions; development of a set of income tax cashflows payable by said life insurance company for each of said financial market scenarios, and corresponding after-tax cashflows; application of market discount factors to said set of pre-tax and after-tax cashflows for each of said financial market scenarios to compute discounted pre-tax and after-tax present values; and computation of the average over said financial market scenarios of said discounted pre-tax and after-tax cashflows.

BRIEF DESCRIPTION OF THE DRAWINGS

The nature and mode of operation of the present invention will now be more fully described in the following detailed description of the invention taken with the accompanying drawing figures, in which:

FIGS. 1A, B, C, and D are an example of a lookup table used in the implementation of the software of the present invention.

DETAILED DESCRIPTION OF THE PREFERRED EMBODIMENT

At the outset, it should be appreciated that like drawing numbers on different drawing views identify identical structural elements of the invention. While the present invention is described with respect to what is presently considered to be the preferred embodiments, it is understood that the invention is not limited to the disclosed embodiments.

The following patent applications are incorporated herein in their entirety. Provisional patent application Ser. Nos. 60/485,805 filed Jul. 9, 2003 and 60/478,782 filed on Jun. 16, 2003 and patent application Ser. No. 10/463,180 filed on Jun. 16, 2003. All references mentioned are incorporated herein by reference for the purpose of describing and disclosing, for example, materials, systems, and methodologies that are described in the references, which might be used in connection with the presently described invention. The references discussed above and throughout the text are provided solely for their disclosure prior to the filing date of the present application. Nothing herein is to be construed as an admission that the inventors are not entitled to antedate such disclosure by virtue of prior invention.

Product Description

We define a tax flow-through annuity product as one that provides the purchaser with flow-through taxation of the underlying investments. By this we mean that despite the fact that an insurance company may hold legal title to the underlying investments, the annuity owner is taxed as if he or she held the assets directly. There is no obvious limit, other than administrative convenience, on how many investment choices can be made available within the tax flow-through annuity structure.

One component of the tax flow-through annuity product design is a variable annuity that invests in publicly available mutual funds, deliberately failing the diversification requirements of Regulation 1.817-5. Merely doing this, however, would lead to loss of tax deferral coupled with ordinary income taxation of dividends and capital gains, a worse tax result than for a typical variable annuity.

Also, additional components of the product design are required to ensure that the investment assets are owned by the contract owner, rather than the insurance company, for tax purposes. Dividends and capital gains are then taxed as such, rather than as ordinary income, despite the apparent regulatory requirement for ordinary income taxation. Further product design components can improve the tax treatment of the investment choices, making them more tax-efficient than ordinary mutual funds and achieving results similar to exchange-traded funds (ETF's), even for actively-managed funds (ETF's are currently limited to passive replication of an index).

Premiums (amounts invested) for the tax flow-through annuity are paid in cash, by electronic funds transfer, or any means known to those of skill in the art.

In contrast to ordinary variable annuities, which provide only for cash withdrawals, the present invention permits withdrawals either in cash or by taking delivery of portfolio securities of the publicly available mutual funds included in the product. Similarly, death benefits of ordinary variable annuities are paid in cash. Thus, death benefits can be taken in three ways: in cash, by taking delivery of portfolio securities of the publicly available mutual funds included in the product, or by taking delivery of the shares of the mutual funds. Providing these additional alternatives acts to improve the tax efficiency of the present invention as described further below.

The resulting product complements traditional VA's, and is clearly superior to them in a number of respects, offering:

Lifetime income guarantees;
Capital gains tax treatment on annuity withdrawals;
Stock dividends taxed as dividends, not ordinary income;
ETF-like tax efficiency by minimizing capital gains distributions, even on actively-managed funds; and
Wealth transfer efficiency through step-up in basis on death.

The product benefits life insurance carriers by allowing them to:

Offer an innovative VA product with unique tax treatment;
Increase their fee income;
Broaden their customer and distributor base; and
Make an effective marketing response to the changing tax environment.

The many benefits distributors derive from the present invention, include, but are not limited to:

The ability to deliver good news on VA's for existing and potential clients;
Lifetime income with capital gains tax treatment;
ETF-like taxation even with actively managed funds; and
An opportunity to add value by recommending product mix and trading strategy to their clients.

Investor benefits include, but are not limited to:

The ability to realize the full benefit of recent tax reform;
The potential for better tax treatment than existing mutual funds;
A guarantee of lifetime income; and
The ability to pass assets on to heirs efficiently.

Achieving the Desired Tax Flow-Through Treatment

The following obstacles must be navigated in order to achieve tax flow-through treatment for a variable annuity:

Deliberate failure of the investor control test set out in Revenue Ruling 81-225, with the result that the product is not taxed as a typical VA;

Passing of the designated beneficiary/distribution rules in §72 of the Internal Revenue Code, with the result that gains on the product are not necessarily taxed as ordinary income;

Satisfaction of the §851(b)(4) diversification test by any publicly available mutual funds in the product, required by the Internal Revenue Code for RIC's (regulated investment companies) in general to achieve flow-through taxation of dividends and capital gains; and The grant by the IRS of a private letter ruling (PLR) holding that the diversification requirements imposed on variable annuities by §817 of the Internal Revenue Code are inapplicable, given that investor control exists as outlined in the first point.

If all of these obstacles can be successfully navigated then the owner of the tax flow-through annuity will be taxed as if he or she held the underlying investments directly. The first three factors are a matter of compliance with existing regulation, and tax counsel asserts that the odds of an appropriate PLR being granted are fair to good.

Achieving ETF-Like Tax Efficiency

Withdrawal and death benefits under the product have three modes of payment:

in cash (or equivalently by electronic funds transfer);
by delivery of mutual fund shares (if mutual funds are available investment alternatives for the product); or
by delivery of portfolio securities of the investment alternatives (often referred to as a redemption-in-kind when the investment alternative is a mutual fund).

Encouraging the last type of withdrawal above allows for greater tax-efficiency for any mutual funds available under the product than for a typical mutual fund, given strict compliance with principles of the 1999 SEC Signature no-action letter. This result occurs because mutual funds are required to distribute their realized capital gains (i.e. realized gains on sales of securities) annually. Redemptions-in-kind (i.e. satisfaction of the fund's obligation to the shareholder by delivery of mutual fund portfolio securities, rather than cash) are not considered sales for purposes of this tax computation. Although redemptions-in-kind had traditionally been considered to require delivery of a proportionate share of each portfolio security (or as near as practicable given any applicable rounding constraints), the Signature no-action letter clarified the SEC's position that, given sufficient safeguards to ensure that a fund manager would not deliver overvalued securities to a shareholder, a non-proportionate redemption would be permitted. For the tax flow-through annuity product, the fund manager can achieve improvements in tax-efficiency relative to a traditional mutual fund by satisfying redemption requests using low-basis (high capital gain) securities where possible. An objective of the present invention is to make redemptions-in-kind attractive to the annuity contract owner as well as to the fund manager, by creating a linkage between enhanced benefits or reduced charges and redemptions-in-kind.

Securities Law Issues—Diversification

Any investment funds available through the present invention will also be publicly available (i.e. available to investors other than through the tax flow-through annuity) in order to achieve the desired tax treatment. For example, one may register a life insurance company separate account as a series UIT (unit investment trust): the preferred terminology for each series of the UIT is a "division" of the separate account. Each division is invested in one publicly available mutual fund. Various permutations and combinations of other registration structures known to those of skill in the art is also contemplated.

In order to broaden the scope of permissible investments, in states that adopted enabling legislation for "Investment Annuities" (also known as "wraparound annuities") in the late 1970+s, compliance with this legislation can be used to allow for investments in assets other than mutual funds. Alternatively a life insurance carrier can request exemption from the requirement imposed by the NAIC's (National Association of Insurance Commissioners') Variable Annuity Model Regulation, which imposes the requirement that a life insurance company separate account supporting a variable annuity must either a) meet diversification requirements imposed by the Model Regulation, or b) be invested in mutual funds that meet the diversification requirements of the Investment Company Act of 1940.

Securities Law Issues—Redemptions-In-Kind

As mentioned above, redemptions-in-kind from a fund has long been assumed to require redemption of (approximately) proportionate shares of portfolio securities of the fund. The 1999 SEC Signature No-Action Letter clarified the SEC staffs position that this was not necessary, provided that certain conditions were met, and so it is possible to satisfy redemption requests using low basis securities, within strict limits imposed by the SEC (intended to ensure that fund shareholders are not saddled with overvalued securities). The result is more tax-efficient for fund, since it does not impose any extra tax on the shareholder. Key product design elements of the present invention address how to make this transaction attractive to the fund shareholder (tax flow-through annuity contract owner) as well as to the fund manager.

Securities Law Issues—Redemption Fees

Mutual fund redemption fees can be up to 2% of the amount redeemed (typically, although the SEC has permitted higher fees in some circumstances) and are not required by the SEC to decline over time (unlike Contingent Deferred Sales Loads, or CDSL's—the SEC's characterization of what the insurance industry calls "surrender charges".) It is permissible to waive redemption fees on redemptions-in-kind.

Redemptions-in-kind can be made whenever the fund manager finds it advisable. It follows that it is permissible to perform redemptions-in-kind in the special case in which a brokerage account is made available to the fund shareholder, and the brokerage fee is charged on sales is comparable to, or less than, the redemption fee.

These observations, taken together, provide a method of the present invention for improving the tax-efficiency of any mutual funds within the product on a basis attractive to the annuity contract owner. By imposing a redemption fee on cash redemptions and waiving it on redemptions-in-kind, the contract owner is given an incentive to act in a way that benefits the fund, and is made no worse off thereby.

State Law Issues—Diversification of Investments

If the investment choices within the product consist solely of mutual funds, and these are all diversified in accordance with the requirements of the Investment Company Act of 1940, then the diversification requirements of the relevant state law (the Variable Annuity Model Regulation) will automatically be met. If the choices include investment alternatives other than mutual funds, or are not sufficiently diversified to meet the requirements of the VA Model Regulation, they can be based on enabling legislation for "investment annuities", as passed by California, for instance, in 1976 when such a product met the then-current IRS requirements for tax-deferred treatment. Although this product has an entirely different tax treatment than the "classic" investment annuity, it can still show compliance with state diversification requirements in this manner.

State Law Issues—Transactions with Affiliates

Insurance department approval would generally be required for transfer of securities to and from insurer separate accounts because of concerns about self-dealing. However, the stipulations that were required to satisfy the SEC for the Signature no-action letter seem likely to be sufficient for state insurance department approval (including such requirements as the existence of a readily ascertainable market value for the securities transferred).

State Law Issues—Nonforfeiture Status of CDSL's

Although state nonforfeiture laws regulating minimum cash values for deferred annuities do not technically apply to investment annuities, they do to variable annuities. Making the product available on a widespread basis with mutual funds as one of the investment choices will therefore require a demonstration of compliance with the nonforfeiture provisions of the VA model regulation. Typical mutual fund CDSL's can easily be demonstrated to comply, so the problem reduces to showing compliance for the redemption fees described above. The redemption fee structure that provides the best incentives for contract owner behavior benefiting the fund depends on whether the tax flow-through annuity product is held through a pension plan recognized by the Internal Revenue Code (a "qualified plan") or directly (a "non-qualified plan"). The reason is that transfers of assets from one investment alternative to another ("fund switches") are generally a taxable event if the product is held directly by the contract owner, but not if held by a tax-deferred qualified plan. The optimal redemption fee structure (to be waived) therefore differs depending on whether fund switches are assumed to occur frequently. Disclosed below is each fee structure and its non-forfeiture compliance in turn.

Nonforfeiture for Annuities Held Through Qualified Plans

The broad idea is to optimize the redemption fee (to be waived for redemptions in kind) for fund switches. The Variable Annuity Model Regulation requires testing values for the first 20 contract years at an assumed 7% growth rate after fund management expenses, and to assume that one fund switch occurs per year. The resulting cash value must exceed 90% of the premiums paid accumulated at 7%.

Thus, some simple calculations ($0.9*1.07^{20}=3.48271602$; $1.07^{20}*0.995^{20}=3.50055712$; $1.07^{20}*0.986^{7}=3.50601652$) show that it is permissible to charge 50 basis points (i.e. half a percent of the amount switched, commonly abbreviated to 50 bp) per switch for the life of the contract and satisfy the non-forfeiture requirement, or (better because it provides more incentive for the desired behavior) 140 bp on switches in first seven years and none thereafter and still satisfy the non-forfeiture requirement. Redemption fees are waived on redemptions-in-kind either way.

Nonforfeiture—Non-Qualified

Here, in contrast, the broad idea is to optimize the redemption fee (to be waived) for surrenders. This is slightly more straightforward than the previous case since a redemption fee on surrenders can be treated much like the CDSL's that are the normal subject of a VA nonforfeiture demonstration.

For example, a CDSL scale of 7%/6%/6%/5%/5%/4%/3% of premium (or of the amount redeemed) could be imposed either by the fund or the insurance company. If a 2% redemption fee were imposed as well, the non-forfeiture demonstration could be done as if there were one charge equal to the sum of the two, i.e. the demonstration would be done as if the CDSL scale were 9%/8%/8%/7%/7%/6%/5%, for which compliance can easily be demonstrated. The redemption fee would be waived for redemptions-in-kind.

Statutory Accounting and Pricing Issues

Statutory valuation requirements will be similar to a typical VA, since the product is a VA (or an investment annuity voluntarily complying with most VA regulations) under the governing state law. This implies that CARVM (The Commissioners' Annuity Reserve Valuation Method) and Actuarial Guidelines 33 and 34 (interpreting CARVM for annuities in general and VA's specifically) will apply. Valuation under GAAP (Generally Accepted Accounting Principles) will also be similar to typical VA's but may use somewhat different assumptions since expected contract owner behavior will be different.

Tax reserves for the life insurance company, in contrast, will be very different from a typical VA—rather than being approximately equal to the cash value of the contract, they will be zero for the base product because the insurance company does not have tax ownership of the separate account assets. Reserves for enhanced death benefits, in contrast, will generally not be zero.

Pricing the product requires software that can properly model this unusual reserve structure. Such software is disclosed in the present invention.

Sales Compensation

The most tax-efficient product structure from the annuity contract owner's point of view is one that has a relatively low M&E (mortality and expense guarantee charge). This is because, M&E's are not deducted in determining the client's investment income, while fund fees are. As a result, the optimal sales compensation and fee structure for this product differs from that of a traditional VA. For maximum tax efficiency, asset-based sales compensation could be paid under a 12(b)(1) plan with an annual charge of (for instance) 75 by per year. If heaped sales compensation is to be paid (e.g. 4.5% of each premium), then there are two main alternatives:

a) A contingent deferred sales load could be imposed at the fund level, and the fund could pay the heaped sales compensation, or b) A contingent deferred sales load could be imposed at the annuity policy level, the insurance company could pay the heaped sales compensation, and the asset-based charge would be paid to the life insurance company to help them recoup the cost of the heaped compensation.

Modeling sales compensation costs accurately requires the ability to model changing interest rates and asset values on a basis consistent with the observed prices of financial instruments in the market (bonds, equities, equity options, etc.)

Pricing and managing the tax flow-through annuity product of the present invention therefore requires the development of software specifically designed to model changing interest rates and asset values, expected responses of policyholders and asset managers to those changes, and the actuarial and accounting impacts of those changes. The next section describes these considerations in more detail.

Key Pricing Considerations

Pricing the tax flow-through annuity product requires modeling of:

Equity and fixed-income markets;

Policyholder behavior, including withdrawal rates, mortality rates, proportion of business held within qualified plans, propensity to take redemptions in kind (which may vary depending on whether a policy is qualified or non-qualified);

Fund manager behavior, including investment style, the level of fund management charges, the level of distributor compensation and contingent deferred sales loads, redemption fees charges, and the turnover rate of fund assets;

Insurance company behavior, including separate account level charges, statutory reserve determination, tax reserve determination, guaranteed benefits offered, and profit targets; and;

Assumed regulatory variables such as tax rates and statutory valuation interest rates; as well as attention to the regulatory constraints imposed by state insurance laws and federal tax, securities, and retirement legislation.

As a result the modeling software has a large number of significant differences from traditional VA modeling software, including:

Equity modeling at the level of sub-indices or even individual stocks, including the correlations between the modeled equities, rather than only handling broad-based indices such as the S&P 500;

Detailed term structure modeling;

Policyholder behavior (e.g. fund switching) differing by tax situation (qualified vs. non-qualified policies);

Modeling of the interacting effect of qualified and non-qualified sales on fund inflows and outflows and fund tax-efficiency;

Modeling of redemptions-in-kind;

Inclusion of investment alternatives other than mutual funds;

Modeling of rule-based trading for the investment alternatives;

Modeling of the unique tax reserve situation of the product from the life insurance carrier's perspective, including assumption of a zero DAC tax rate; and Modeling of guaranteed systematic withdrawals as a retirement income alternative under the product.

Financial Models Required For Pricing

A good introduction to some of the key issues related to financial modeling of equity and interest-rate derivatives is *An Introduction to the Mathematics of Financial Derivatives* by Salih N. Neftci.

Tax Flow-Through Annuity Product—Pricing Method

The present invention prices using the NA-GARCH equity option model (see summary of key equations below), allowing for stochastic equity paths and stochastic equity process volatility, and the Libor Market Model (see summary of key equations below), allowing for an arbitrary initial yield curve and stochastic interest rates. Note that the well-known Black-Scholes option pricing model can be obtained as a special case of NA-GARCH in which volatility is constant.

The fully-stochastic method for pricing the tax flow-through annuity product has the following steps:

a) Generate a set of yield curve scenarios consistent with valuation parameters;

b) Generate a set of equity market scenarios (e.g. S&P 500 only, S&P 500 and Nasdaq, etc.) for each yield curve scenario, consistent with the valuation parameters and the yield curve scenario;

c) Using the yield curve and equity market scenarios, and policyholder, fund manager, and insurance company behavioral assumptions, determine a terminal account value and set of pre-tax cashflows, for the product for each scenario;

d) Develop the set of income tax cashflows payable by the life insurance company for the scenario;

e) Apply market discount factors to the pre-tax and after-tax cashflows for each scenario to compute discounted values; and f) Compute the averages of each of the discounted pre-tax and after-tax cashflows.

A description of the key equations of the NA-GARCH Model and Libor Market Model follows.

The NA-GARCH Model

Model Domain: Equity Prices and Equity Option Prices

Key Characteristics of the Model:

1. The model has risk-neutral and physical settings.

2. Equity process volatility is stochastic and may incorporate skew.

3. Market declines are generally associated with increases in volatility.

4. Implied volatilities tend to be a little higher than physical volatilities.

5. The model allows arbitrage-free hedging and pricing of equity options and futures.

6. It is a discrete time, not SDE (stochastic differential equation), model.

Outline of Mathematical Formulation:

1. Equity price movements and changes in instantaneous volatility are driven by the same normal random variate.

2. Parameters control asymmetry (tendency of volatility to increase as market drops) and long-term mean volatility.

Key Equations:

$$ln(S_{t+1}/S_t) = (r_f - d) + \lambda h_t^{1/2} - \tfrac{1}{2} h_t + h_t^{1/2} \upsilon_{t+1}$$

$$h_{t+1} = \beta_0 + \beta_1 h_t + \beta_2 h_t (\upsilon_{t+1} - c)^2$$

What The Variables Mean:

$S_{t+1}$ and $S_t$ are the values of the equity price at successive intervals, $r_f$ is the risk-free yield over an interval, d is the dividend yield on the equity over the same interval, $\lambda$ is a risk parameter (zero for arbitrage-free pricing), $h_t$ is the instantaneous variance (volatility squared) over the interval, $\upsilon_{t+1}$ is a normal random variate, $\beta_0$, $\beta_1$, and $\beta_2$ are parameters controlling the level and volatility of volatility, and c is a parameter controlling asymmetry (i.e. the degree to which market declines are associated with increases in volatility).

Note: To change from the physical to the risk-neutral setting, set c:=c+$\lambda$, then set $\lambda$:=0.

Implementation Notes:

1. The implementation disclosed by the present invention is mostly Monte Carlo with a number of pre-computations to achieve acceptable speed: analytical approximations are not very useful for this model. Although lattice methods could be used they become difficult to apply for path-dependent options.

2. Parameters can be estimated given an option price, index, interest rate, and dividend history. The values currently used in the implementation were derived from a least-squares fit to S&P 500 listed option price history and physical index history over the period 1984-2001.

The Libor Market Model

Model Domain: Yield Curves and Interest Rate Options.

Key Characteristics of the Model:

1. The model has arbitrage-free and physical settings, depending on whether the market price of risk is set to zero (arbitrage-free) or not (physical).

2. In the arbitrage-free setting, the model can reproduce market prices of bonds and fixed income options.

3. In the physical setting, the model can generate realistic (i.e. simulated historical) bond price scenarios.

4. The yield curve can undergo a variety of realistic non-parallel shifts.

5. The correlation structure of changes in the yield curve can be based on physical volatility data (historical time series) or current market volatility data (e.g. futures option prices).

Outline of Mathematical Formulation:

1. The yield curve can be modeled using different measures (e.g. forward measure, spot Libor measure).

2. We give the forward measure equations since the Hunter-Jäckel-Joshi predictor-corrector method is useful in taking longer time steps.

3. Bond prices divided by the numeraire are martingales.

4. Forward Libor interest rates are assumed to be lognormally distributed.

5. Discrete tenors (zero-coupon bonds maturing integral periods of time from the initial date) are assumed.

6. Natural cubic spline interpolation is used to derive bond prices at other maturities in the scenario generator.

Key Equations (Forward measure):

$$L_n(t) = (1/\delta)[B(t, T_n)/B(t, T_{n+1}) - 1]$$

$$dL_{n-1}(t) = L_{n-1}(t)\gamma_{n-1}(t).dW_n(t)$$

$$dW_{n+1}(t) = dW_n(t) + \delta\gamma_n(t)L_n(t)/(1+\delta L_n(t))dt$$

What The Variables Mean:

$B(t, T_n)$ is the price at time t of a bond maturing at time $T_n$, $\delta$ is the common spacing between $T_0, T_1, \ldots T_n$, $L_n(t)$ is a forward Libor rate at time t, $dW_n(t)$ is an increment in d-dimensional Brownian motion at time t, $\gamma_{n-1}(t)$ is a d-dimensional vector volatility function, and . is the inner product of two d-dimensional vectors.

Despite the name "Libor Market Model", there is no bar to applying the model to other variants known to those of skill in the art such as Treasury rates.

As indicated above, the present invention can be embodied in the form of an apparatus with means for the implementing the method, computer-implemented processes and apparatuses for practicing those processes. The present invention can also be embodied in the form of computer program code embodied in tangible media, such as floppy diskettes, CD-ROMs, DVDs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

Thus, it is seen that the objects of the invention are efficiently obtained, although modifications and changes to the invention may be readily imagined by those having ordinary skill in the art, and these changes and modifications are intended to be within the scope of the claims.

I claim:

1. A computer-based method for pricing a tax flow-through deferred variable annuity product with a plurality of underlying investments, comprising
   a) generating, using a processor for a specially programmed computer, a set of yield curve scenarios consistent with valuation parameters;
   b) generating, using the processor, a financial market scenario for each of said yield curve scenarios, comprising said yield curve scenario and an equity market scenario consistent with said yield curve scenario and said valuation parameters;
   c) determining, using the processor, a terminal account value and set of pre-tax cashflows for said tax flow-through deferred variable annuity product, for each of said financial market scenarios, incorporating policyholder, investment manager, and insurance company behavioral assumptions, wherein said insurance company holds legal title to the underlying investments and an owner of the tax flow-through deferred variable annuity product is taxed as if the owner holds the underlying investments assets directly;
   d) developing, using the processor, a set of income tax cashflows payable by a life insurance company for each of said financial market scenarios, and corresponding after-tax cashflows;
   e) applying, using the processor, market discount factors to said set of pre-tax and after-tax cashflows for each of said financial market scenarios to compute discounted pre-tax and after-tax present values; and
   f) computing, using the processor, the average over said financial market scenarios of said discounted pre-tax and after-tax cashflows.

2. The computer-based method for pricing a tax flow-through annuity product with a plurality of underlying investments as recited in claim 1, wherein at least one of said plurality of underlying investments is a mutual fund which has at least one shareholder which is not a life insurance company.

3. The computer-based method for pricing a tax flow-through annuity product with a plurality of underlying investments as recited in claim 1, wherein at least one of said plurality of underlying investments is a unit investment trust which has at least one unitholder which is not a life insurance company.

4. The computer-based method for pricing a tax flow-through annuity product with a plurality of underlying investments as recited in claim 1, wherein at least one of said plurality of underlying investments is a hedge fund which has at least one investor which is not a life insurance company.

5. The computer-based method for pricing a tax flow-through annuity product with a plurality of underlying investments as recited in claim 1, wherein at least one of said plurality of underlying investments is a life insurance company separate account which has at least one investor which is not a life insurance company.

6. The computer-based method for pricing a tax flow-through annuity product with a plurality of underlying investments as recited in claim 1, wherein at least one of said plurality of underlying investments is a custodial account which has at least one investor which is not a life insurance company.

7. The computer-based method for pricing a tax flow-through annuity product with a plurality of underlying investments as recited in claim 1, wherein at least one of said plurality of underlying investments is a brokerage account which has at least one investor which is not a life insurance company.

8. The computer-based method for pricing a tax flow-through annuity product with a plurality of underlying investments as recited in claim 1, wherein at least one of said plurality of underlying investments is a futures account which has at least one investor which is not a life insurance company.

9. The computer-based method for pricing a tax flow-through annuity product with a plurality of underlying investments as recited in claim 1, wherein at least one of said plurality of underlying investments is a commodity pool which has at least one investor which is not a life insurance company.

10. The computer-based method for pricing a tax flow-through annuity product with a plurality of underlying investments, as recited in claim 2, further comprising using the processor and a redemption-in-kind process to reduce the capital gains distributions of the fund.

11. The computer-based method for pricing a tax flow-through annuity product with a plurality of underlying investments as recited in claim 1, wherein said sales compensation is paid as a constant level percentage of the assets invested.

12. The computer-based method for pricing a tax flow-through annuity product with a plurality of underlying investments as recited in claim 1, wherein said sales compensation is paid as a time-varying percentage of the assets invested.

13. The computer-based method for pricing a tax flow-through annuity product with a plurality of underlying investments as recited in claim 1, wherein said sales compensation paid varies depending on the type of underlying investment.

14. The computer-based method for pricing a tax flow-through annuity product with a plurality of underlying investments as recited in claim 1, wherein said annuity death benefit equals the total value of the underlying investments.

15. The computer-based method for pricing a tax flow-through annuity product with a plurality of underlying investments as recited in claim 1, wherein said annuity death benefit equals a percentage (greater than 100%) of the total value of the underlying investments.

16. The computer-based method for pricing a tax flow-through annuity product with a plurality of underlying investments as recited in claim 1, wherein a specified percentage of the amount invested is guaranteed by said life insurance company to be returned to said policyholder under a systematic withdrawal program.

17. The computer-based method for pricing a tax flow-through annuity product with a plurality of underlying investments, as recited in claim 10, wherein a brokerage account is offered in conjunction with said annuity.

* * * * *